(12) United States Patent
Ozaki et al.

(10) Patent No.: US 7,374,842 B2
(45) Date of Patent: May 20, 2008

(54) NON-AQUEOUS ELECTROLYTE SECONDARY BATTERY

(75) Inventors: Yoshiyuki Ozaki, Wakayama (JP); Kazuhiro Ota, Sanda (JP); Junichi Yamaura, Kobe (JP); Takabumi Fujii, Suita (JP)

(73) Assignee: Matsushita Battery Industrial Co., Ltd., Osaka (JP)

( * ) Notice: Subject to any disclaimer, the term of this patent is extended or adjusted under 35 U.S.C. 154(b) by 786 days.

(21) Appl. No.: 10/833,141

(22) Filed: Apr. 28, 2004

(65) Prior Publication Data

US 2004/0219431 A1    Nov. 4, 2004

(30) Foreign Application Priority Data

Apr. 30, 2003 (JP) ............................. 2003-125140
Jul. 7, 2003 (JP) ............................. 2003-271503

(51) Int. Cl.
*H01M 4/58* (2006.01)
*H01M 10/40* (2006.01)

(52) U.S. Cl. ............................. 429/231.8; 429/231.2; 429/324

(58) Field of Classification Search ............... None
See application file for complete search history.

(56) References Cited

U.S. PATENT DOCUMENTS

2003/0054254 A1* 3/2003 Kubo et al. ............... 429/233

FOREIGN PATENT DOCUMENTS

| JP | 6-275321 | | 9/1994 |
|---|---|---|---|
| JP | 06-275321 | * | 9/1994 |
| JP | 9-171814 | | 6/1997 |
| JP | P2000-200624 A | | 7/2000 |
| JP | P2000-260479 A | | 9/2000 |
| JP | P2000-260480 A | | 9/2000 |

* cited by examiner

*Primary Examiner*—John S Maples
(74) *Attorney, Agent, or Firm*—McDermott Will & Emery LLP

(57) ABSTRACT

A non-aqueous electrolyte secondary battery, comprises positive and negative electrode plates, each comprising a current collector and a material mixture layer carried on each face thereof. A total thickness of the positive electrode material mixture layers on both faces of the current collector is 40 μm to 100 μm. The positive electrode plate has an electrode area of 520 $cm^2$ to 800 $cm^2$ per battery capacity of 1 Ah. The negative electrode material mixture layer comprises a graphitizable carbon material. A wide-range X-ray diffraction pattern of the graphitizable carbon material has a peak PX (101) attributed to a (101) crystal face at about 2θ=44 degrees, and a peak PX (100) attributed to a (100) crystal face at about 2θ=42 degrees. A ratio of an intensity IX (101) of PX (101) to an intensity IX (100) of PX(100) satisfies: 0<IX (101)/IX (100)<1.

6 Claims, 8 Drawing Sheets

NON-AQUEOUS ELECTROLYTE SECONDARY BATTERY

BACKGROUND OF THE INVENTION

As having high operation voltage and high energy density, non-aqueous electrolyte secondary batteries, such as lithium-ion secondary batteries, have come into practical use as power sources for driving portable electronic instruments such as cell phones, laptop computers and video camcoders. Non-aqueous electrolyte secondary batteries have been in the mainstream of small-sized secondary batteries and the production volume thereof is on the increase.

As a positive electrode active material of non-aqueous electrolyte secondary batteries, a lithium-containing composite oxide with a 4V-class high voltage has been in use. Typical lithium-containing composite oxides include $LiCoO_2$ and $LiNiO_2$ which have a hexagonal structure, and $LiMn_2O_4$ which has a spinel structure. Among them, the mainstream one has been $LiCoO_2$ since it has high operation voltage and high energy density.

For negative electrodes used have been carbon materials capable of absorbing and desorbing lithium ions. Among those materials, the prevailing one is a graphite material with a flat discharge potential and high specific density (capacity density).

Recently, not only the development of non-aqueous electrolyte secondary batteries for small-sized customer application, but the development of large-sized non-aqueous electrolyte secondary batteries, having a large capacity for power storage, electric vehicles and the like, has been accelerated. For example, hybrid electric vehicles (HEVs) loaded with nickel-metal hydride batteries have already been in mass production and available in the market. Further, HEVs loaded with non-aqueous electrolyte secondary batteries in place of nickel-metal hydride batteries are under development.

Batteries used for HEVs and the like are required to have high input/output power performance for immediate power-assistance of an engine and regeneration of energy, and in this respect, they are significantly different from batteries for small-sized customer application. Preference is therefore given to higher output power over higher energy density. For achieving higher output power, it is necessary to minimize internal resistance of a battery. For this reason, attempts have been made not only to develop and select active materials and an electrolyte, but also to improve current collecting structure of an electrode, reduce component resistance, and make an electrode thinner and longer so as to increase a reactive area of the electrode.

In non-aqueous electrolyte secondary batteries for small-sized customer application, normally, a positive electrode active material comprising $LiCoO_2$ is combined with a negative electrode active material comprising a graphite material. In large-sized non-aqueous electrolyte secondary batteries, however, a combination of a positive electrode active material comprising another lithium-containing composite oxide besides $LiCoO_2$ and a negative electrode active material comprising a low crystalline carbon material, such as a non-graphitizable carbon material, has been considered as promising.

Examples of negative electrode materials that have hitherto been proposed may include: a graphite material primarily used in small-sized customer application (Japanese Laid-Open Patent Publication No. 2000-260479); a non-graphitizable carbon material with low crystallinity (Japanese Laid-Open Patent Publication No. 2000-200624); and a pseudo-graphite material with a controlled graphitization degree (Japanese Laid-Open Patent Publication No. 2000-260480).

However, a graphite material has a structure of hexagonal layers regularly arranged in a c-axis direction. During charge, lithium is intercalated between the graphite layers to extend each interval of the layers, leading to expansion of the graphite. Stress to be applied to the graphite associated with the expansion becomes considerably large when charge with a large-current pulse is repeated. This causes a gradual decrease in charging capability (acceptance of charge) of the graphite, thereby increasing deterioration in battery cycles.

In charge/discharge reactions of non-graphitizable carbon, on the other hand, there occurs almost no intercalation of lithium between the graphite layers during the charge. This is because most of lithium is inserted into pores of the non-graphitizable carbon. For this reason, just a small amount of stress is applied to the non-graphitizable carbon due to the expansion and shrinkage thereof through charging/discharging. Since non-graphitizable carbon has lower conductivity than graphite carbons, however, the internal resistance thereof increases during discharge when lithium is deintercalated. This tendency becomes conspicuous especially when large-current discharge is repeated.

A pseudo-graphite material is a carbon material with a relatively high graphitization degree since the crystallite thereof in a c-axis direction has a thickness "Lc" of not smaller than 60 nm and smaller than 100 nm. Therefore, the charging capability of the pseudo-graphite material tends to decrease in almost the same manner as in the case of using graphite.

Moreover, another carbon material has been proposed wherein, in a wide-range X-ray diffraction pattern, a ratio of an intensity I (101) of a peak attributed to a (101) crystal face to an intensity I (100) of a peak attributed to a (100) crystal face satisfies: $0.7 \leq I(101)/I(100) \leq 2.2$ (Japanese Laid-Open Patent Publication No. Hei 6-275321). Although this carbon material has a developed hexagonal layered structure, there exists slight misalignment or torsion between layers, as compared with natural graphite having a graphite structure proximate to a monocrystal. It is described that the ratio of I (101) to I (100) is preferably 0.8 or larger and that a favorable characteristic is exhibited when the ratio of I (101) to I (100) is 1.0 or larger. This proposal however does not relate to non-aqueous electrolyte secondary batteries with high output power. Therefore, the negative electrode and the positive electrode thereof are as thick as 180 μm and 270 μm, respectively, and the electrode area per battery capacity of 1 Ah is not smaller than 125 $cm^2$ and not larger than 500 $cm^2$.

Furthermore, a combination of two kinds or more of carbon materials, a spacing (d002) of which in a c-axis direction is not larger than 0.34 nm, has also been proposed (Japanese Laid-Open Patent Publication No. Hei 9-171814). It is proposed that the preferable (d002) of a carbon material having the largest mean particle size is less than 0.337 nm whereas the preferable (d002) of a carbon material having the smallest mean particle size is not smaller than 0.337 nm and not larger than 0.34 nm. However, this proposal is aimed at achieving a non-aqueous electrolyte secondary battery with high energy density and long cycle life, and does not relate to a high input/output power battery.

Next, charge/discharge cycle conditions of high output power non-aqueous electrolyte secondary batteries significantly differ from those of normal batteries for small-sized customer application. In general, a high output power non-aqueous electrolyte secondary battery is not sequently charged or discharged between a fully discharged state and a fully charged state. A typical charging/discharging operation of this battery is to repeat pulse charge/discharge on the second time scale with a 50-60% charged state taken as a base point. Such a battery is required to be capable of repeating pulse charge and pulse discharge with various currents from a small current to a large current.

When pulse charge/discharge are repeated for a long period of time, however, the charging/discharging capability of the electrode active material deteriorates and the capacity decreases as well as the internal resistance of the battery increases. As a result, in the application of HEVs, for example, power-assisting and regenerating capability become insufficient. Accordingly, in the technical development of high output power non-aqueous electrolyte secondary batteries, lengthening lifetime is as important as improving output power.

BRIEF SUMMARY OF THE INVENTION

The present invention relates to a non-aqueous electrolyte secondary battery, and especially relates to a non-aqueous electrolyte secondary battery having excellent charge/discharge cycle life with a large current pulse, or excellent long-term durability.

It is an object of the present invention to minimize deterioration in capacity as well as an increase in internal resistance even when charge/discharge with a large current pulse is repeated for a long period of time. It is also an object of the present invention to improve a cycle life of a non-aqueous electrolyte secondary battery.

The present inventors have found that deterioration in capacity and an increase in internal resistance during pulse charge/discharge cycles are primarily caused by a carbon material in a negative electrode plate.

The present inventors have conducted extensive studies on the kind and crystallinity of carbon materials in order to minimize stress generated through an intercalation reaction of lithium. The present inventors optimized electrode design while strictly controlling graphitization degrees of carbon materials, to accomplish the following invention.

The present invention relates to a non-aqueous electrolyte secondary battery comprising: (a) a positive electrode plate comprising a positive electrode current collector and a positive electrode material mixture layer carried on each face of the positive electrode current collector; (b) a non-aqueous electrolyte; and (c) a negative electrode plate comprising a negative electrode current collector and a negative electrode material mixture layer carried on each face of the negative electrode current collector, wherein the positive electrode material mixture layer comprises a lithium-containing composite oxide, a total thickness of the positive electrode material mixture layers on both faces of the positive electrode current collector is not smaller than 40 μm and not larger than 100 μm, the positive electrode plate has an electrode area of not smaller than 520 cm² and not larger than 800 cm² per battery capacity of 1 Ah, the negative electrode material mixture layer comprises a graphitizable carbon material capable of absorbing and desorbing lithium, a wide-range X-ray diffraction pattern of the graphitizable carbon material, which is measured by means of CuKα rays, has a peak PX (101) attributed to a (101) crystal face at an angle of about 2θ=44 degrees, and a peak PX (100) attributed to a (100) crystal face at an angle of about 2θ=42 degrees, and a ratio of an intensity IX (101) of PX (101) to an intensity IX (100) of PX(100) satisfies the formula (1):

$0 < IX(101)/IX(100) < 1.$

Herein, the peak intensities IX (101) and IX (100) can be defined by a "height" from the base line of the background of the X-ray diffraction pattern.

It is preferable that the negative electrode plate have a specific density of not smaller than 170 Ah/kg and not larger than 250 Ah/kg when the non-aqueous electrolyte secondary battery is in a fully charged state.

It is preferable that a thickness Lc (004) of a crystallite in a c-axis direction of the graphitizable carbon material be not smaller than 20 nm and smaller than 60 nm, and a thickness La (110) of a crystallite in an a-axis direction of the graphitizable carbon material be smaller than Lc (004).

The negative electrode material mixture layer can further comprise graphite.

When the negative electrode material mixture layer comprises graphite, it is preferable that a percentage of the graphitizable carbon material content in the total amount of the graphite and graphitizable carbon material be not smaller than 50 wt % and not larger than 80 wt %. Moreover, when the non-aqueous electrolyte secondary battery is in a fully charged state, the specific density of the negative electrode plate is preferably not smaller than 170 Ah/kg and not larger than 300 Ah/kg, and particularly preferably larger than 250 Ah/kg and not larger than 300 Ah/kg, in order to maintain high energy density to allow higher input/output power of the battery.

It is preferable that a wide-range X-ray diffraction pattern of graphite, which is measured by means of CuKα rays, have a peak PY (101) attributed to a (101) crystal face at an angle of about 2θ=44 degrees, and a peak PY (100) attributed to a (100) crystal face at an angle of about 2θ=42 degrees, and a ratio of an intensity IY (101) of PY (101) to an intensity IY (100) of PY (100) satisfies the formula (2):

$1.5 < IY(101)/IY(100) < 2.5.$

Herein, "battery capacity" as in the term "per battery capacity of 1 Ah" refers to a nominal capacity (rated capacity) of a battery regulated by a positive electrode.

As thus described, in the present invention, the electrode design is optimized while the graphitization level of the carbon material in the negative electrode material mixture layer is strictly controlled. As a result, stress to be applied to the carbon material during the charge/discharge with a large current can be minimized. Moreover, a non-aqueous electrolyte secondary battery excellent in charge/discharge cycle life characteristic with a pulse current as well as long-term reliability can be obtained.

Specifically, the aforementioned battery structure enables minimization of deterioration in capacity and of an increase in internal resistance even when charge/discharge with a high-load pulse current are repeated for a long period of time. It is therefore possible to obtain a non-aqueous electrolyte secondary battery exerting high input/output power and an excellent cycle life characteristic. Further, the use of a graphitizable carbon material in combination with graphite for a negative electrode allows design of a high capacity negative electrode resistible to a high-load, whereby design of a high energy density of a battery can be accomplished.

As for lithium-ion secondary batteries for HEVs, the demands are high especially for a high input/output power characteristic as well as long-term durability, and also for cost reduction. The present invention satisfies all those demands.

While the novel features of the invention are set forth particularly in the appended claims, the invention, both as to organization and content, will be better understood and

DETAILED DESCRIPTION OF THE INVENTION

Figure 1:
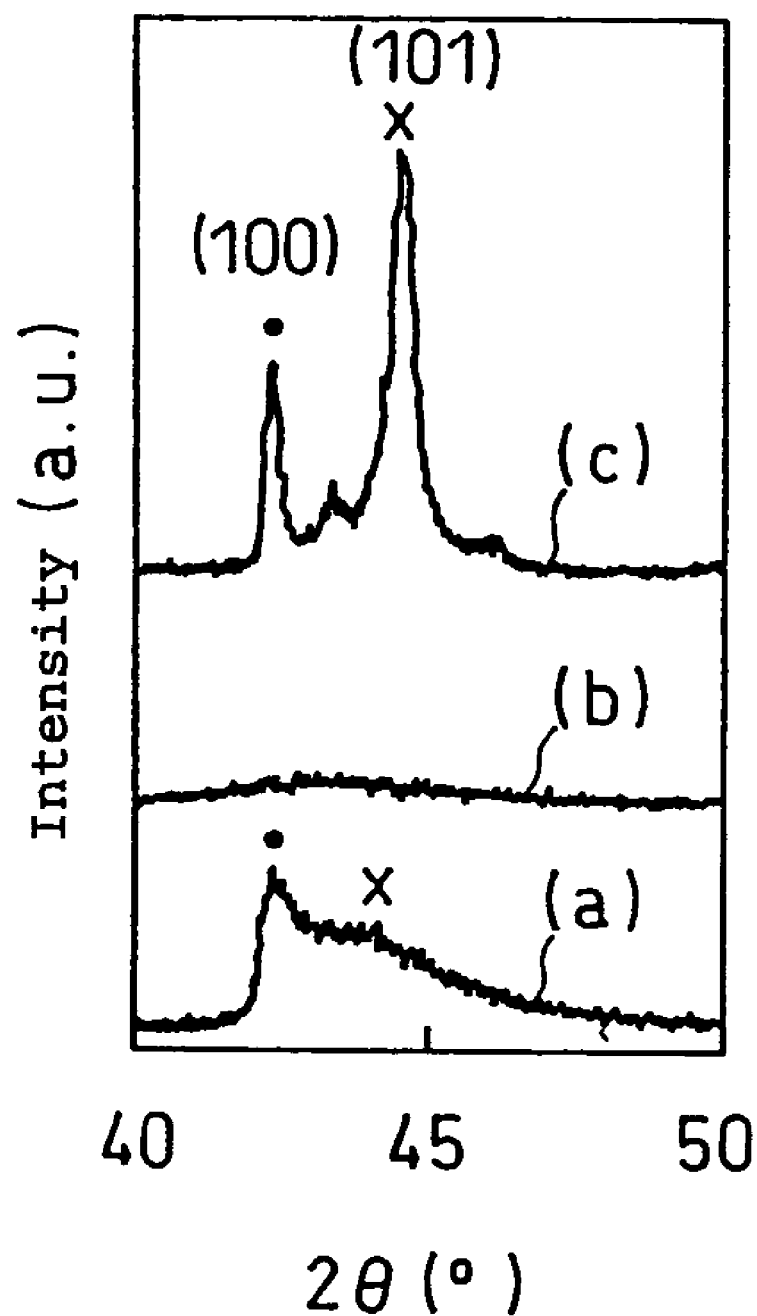
FIG. 1 is X-ray diffraction patterns of carbon materials used for negative electrode plates in EXAMPLE 1 and COMPARATIVE EXAMPLES 1 and 2.

A non-aqueous electrolyte secondary battery of the present invention comprises: (a) a positive electrode plate comprising a positive electrode current collector and a positive electrode material mixture layer carried on each face of the positive electrode current collector; (b) a non-aqueous electrolyte; and (c) a negative electrode plate comprising a negative electrode current collector and a negative electrode material mixture layer carried on each face of the negative electrode current collector.

As the positive electrode current collector, the negative electrode current collector and the non-aqueous electrolyte, ones known in the art can be used without any specific limitation.

A typical positive electrode material mixture comprises a positive electrode active material, a conductive material and a binder.

A typical negative electrode material mixture layer comprises a negative electrode active material and a binder.

As the conductive material and the binder, ones known in the art can be used without any specific limitation.

As the positive electrode active material, a lithium-containing composite oxide is used. As the lithium-containing composite oxide to be used, ones known in the art can be used, which may be exemplified by $LiCoO_2$ and $LiNiO_2$, and $LiMn_2O_4$ having a spinel structure.

Part of a transition metal contained in the composite oxide can be replaced with another element in order to improve a cycle life characteristic of a battery. For example, a composite oxide, obtained by replacing part of the Ni element in $LiNiO_2$ with the element of Co, Al, Mn or the like, can preferably be used.

An oxide or the like containing no lithium immediately after the production thereof can also be used. In that case, lithium gets contained in the oxide or the like by a subsequent treatment.

In the interests of higher output power of a battery, it is important to reduce internal resistance of the battery. For the reduction in internal resistance, it is desirable that the distance between an electrode current collector and the surface of an electrode material mixture layer be as short as possible. Namely, it is desirable to make the thickness of the electrode material mixture layer smaller. It is further desirable to make an electrode reaction area as large as possible for the reduction in internal resistance.

Specifically, the total thickness of two positive electrode material mixture layers carried on both faces of a positive electrode current collector needs to be not smaller than 40 µm and not larger than 100 µm.

When the total thickness of the positive electrode material mixture layers is smaller than 40 µm, a current density per unit electrode area is small. However, since an amount of an active material carried per unit electrode area decreases, a current density per unit weight of the active material increases. Consequently, when the total thickness of the positive electrode material mixture layers is smaller than 40 µm, the electrode is inappropriate for a high output power battery. In the meantime, when the total thickness of the positive electrode material mixture layers exceeds 100 µm, the battery internal resistance increases, and further, a battery cannot be obtained which is suitable for charge/discharge cycles with a large current pulse, regardless of selection of a carbon material, as the negative electrode active material. The favorable total thickness of the positive electrode material mixture layers is not smaller than 40 µm and not larger than 70 µm.

It is further necessary that the electrode area of the positive electrode plate per battery capacity of 1 Ah be not smaller than 520 cm$^2$ and not larger than 800 cm$^2$.

Herein, the term "electrode area" refers to an area of one surface of the positive electrode material mixture layer carried on the positive electrode current collector. Further, the term "electrode area" does not refer to an accurate area, but an area on the assumption that the surface of the positive electrode material mixture layer is completely flat. In the case of a battery comprising a plurality of positive electrode plates and negative electrode plates (e.g. stacked cell), multiplication of the area of one surface of a positive electrode material mixture layer by the number of the positive electrode plates gives an "electrode area" value.

The electrode areas per battery capacity of 1 Ah of the positive electrode plate and the negative electrode plate vary in conjunction with the thickness of the electrode material mixture layers.

When the electrode area of the positive electrode plate per battery capacity of 1 Ah is smaller than 520 cm$^2$, higher output power is difficult to achieve. On the other hand, when the electrode area of the positive electrode plate per battery capacity of 1 Ah exceeds 800 cm$^2$, the positive electrode material mixture layer becomes so thin as to be inappropriate for an electrode for a high output power battery. Moreover, when an extremely thin and long electrode is produced and used, battery productivity decreases. The preferable electrode area of a positive electrode plate per battery capacity of 1 Ah is not smaller than 530 cm$^2$ and not larger than 600 cm$^2$.

By using a later-described graphitizable carbon material for the negative electrode material mixture layer while applying the electrode structure as thus described, it is possible to satisfy an excellent charge/discharge cycle characteristic with a large current pulse. Namely, a combination of favorable design of the electrode and control of a graphitization degree of the carbon material in the negative electrode is important for satisfying the charge/discharge cycle characteristic with a large current pulse.

A graphitizable carbon material is a carbon material in the midstream of the process of graphitization. The graphitizable carbon material has a hexagonal regular arrangement in part and produces an intercalation compound through intercalation of lithium during charge.

On the other hand, a carbon material having a turbostratic structure, such as coke, neither has a hexagonal regular arrangement nor produces an intercalation compound through intercalation of lithium. In the case of such a carbon material having a turbostratic structure, lithium is stored or adsorbed in pores or the turbostratic structure portion of the carbon material.

Since the graphitizable carbon material is in the midstream of the process of graphitization, the layered structure of the graphite is not sufficiently developed. For this reason, an amount of lithium that can be intercalated into the graphitizable carbon material is smaller than that of graphite. As compared with a non-graphitizable carbon material, an amount of lithium to be stored in the pores of the graphitizable carbon material is also smaller. The graphitizable carbon has a limited capacity for reversible charge/discharge.

From the perspective of alleviating restrictions in designing a battery capacity, therefore, the use of a graphitizable carbon material in combination with graphite is preferred. That is, the negative electrode material mixture layer can comprise both a graphitizable carbon material and graphite. The use of both a graphitizable carbon material and graphite allows an increase in reversible specific density of the negative electrode to cover a low reversible specific density of the graphitizable carbon material. Further, as graphite has high conductivity, it enables enhancement of conductivity of the negative electrode to improve a discharge characteristic of the battery.

As thus described, in the case of using a graphitizable carbon material in combination with graphite, it is possible to improve charging capability of the negative electrode plate during charge/discharge cycles with a large current pulse, and further to improve a discharge characteristic during charge/discharge cycles with a large current pulse, without lowering of the battery capacity.

It is preferable that a percentage of the graphitizable carbon material content in the total amount of the graphitizable carbon material and the graphite be not smaller than 50 wt % and not larger than 80 wt %. With the percentage of the graphitizable carbon material content below 50 wt %, the effect of enhancing the charging capability of the negative electrode plate during charge/discharge cycles with a large current pulse gradually decreases. With the percentage of the graphitizable carbon material content over 80 wt %, on the other hand, the effect of increasing the battery capacity decreases.

For identifying the graphitizable carbon material, a wide range X-ray diffraction is effectively applied.

In a measurement of an X-ray diffraction pattern of the carbon material by means of CuKα rays, a peak is observed at an angle of about 2θ=42 degrees. In the case of carbon having a turbostratic structure, this peak is attributed to a two-dimensional (100) crystal face and is very broad.

With the development of the layer structure of graphite, apart from the peak at an angle of about 2θ=42 degrees, another broad peak then begins to be observed at an angle of about 2θ=44 degrees. This peak is attributed to a (101) crystal face. The emergence of the peak attributed to the (101) crystal face indicates development of a three-dimensional graphite structure. With the development of the tree-dimensional graphite structure, the peak at an angle of about 2θ=42 degrees then begins to be observed as a peak attributed to the (100) crystal face which indicates a three-dimensional structure.

The wide range X-ray diffraction pattern measured by means of CuKα rays of the graphitizable carbon material, which can be used in the present invention, is required to have a peak PX (101) attributed to a (101) crystal face at an angle of about 2θ=44 degrees, and a peak PX (100) attributed to a (100) crystal face at an angle of about 2θ=42 degrees. Further, a ratio of an intensity IX (101) of PX (101) to an intensity IX (100) of PX(100) needs to satisfy the formula (1): 0<IX (101)/IX (100)<1.

In a wide range X-ray diffraction pattern of a carbon material, when the peak attributed to the (101) crystal face is not recognized, or I (101)/I (100)=0, the carbon material has almost no graphite structure. When such a carbon material is employed, conductivity of the negative electrode plate decreases, and especially during discharge with a large current pulse, the conductivity of the negative electrode plate apparently becomes insufficient.

When the ratio of IX (101)/IX (100) is not smaller than 1, the carbon material can be regarded as being close to the state of graphite rather than being in the midstream of the process of graphitization. With the use of such a carbon material, the charging capability of the negative electrode plate tends to decrease during charge/discharge cycles with a large current pulse.

The range of the ratio IX (101)/IX (100) is preferably 0.8 or smaller, and particularly preferably below 0.7. Further, the ratio of IX (101)/IX (100) is preferably 0.5 or larger, and particularly preferably 0.6 or larger. When the ratio of IX (101)/IX (100) is smaller than 0.5, the discharge characteristic may sometimes decrease during charge/discharge cycles with a large current pulse.

It is to be noted that a spacing (d002) between (002) crystal faces has hitherto been used as a measure of a graphitization degree. However, when the ratio IX (101)/IX (100) is below 1.0, (d002) values are always about 0.34 nm, and it is thus difficult to determine a difference of (d002) values.

It is preferable that graphite that can be used in combination with the graphitizable carbon material have the following physical properties.

Namely, it is preferable that a wide range X-ray diffraction pattern of graphite, measured by means of CuKα rays, have a peak PY (101) attributed to a (101) crystal face at an angle of about 2θ=44 degrees, and a peak PY (100) attributed to a (100) crystal face at an angle of about 2θ=42 degrees, and a ratio of an intensity IY (101) of PY (101) to an intensity IY (100) of PY (100) satisfy the formula (2): 1.5<IY (101)/IY (100)<2.5.

Graphite of this case has substantially a perfect layer structure. Such a layer structure allows improvement of conductivity of the negative electrode plate and particularly permits improvement of a discharge characteristic during charge/discharge cycles with a large current pulse.

As thus described, there is a limitation to the specific density for reversible charge/discharge of a graphitizable carbon material. Therefore, when a graphitizable carbon material and graphite are not used in combination, or when the ratio of the graphite to the graphitizable carbon material is too small, the specific density of the negative electrode plate in a fully charged battery is preferably 250 Ah/kg or smaller. When the specific density of the negative electrode plate is beyond 250 Ah/kg, it has a potential of exceeding the reversible specific density of the negative electrode plate. In this case, repetition of charge/discharge cycles may result in such a defect as deposition of metallic lithium on the surface of the negative electrode plate. When the specific density of the negative electrode plate in a fully charged battery is below 170 Ah/kg, on the other hand, the battery capacity extremely decreases and the battery voltage also decreases.

In view of what was described above, when a graphitizable carbon material and graphite are not used in combination, or the ratio of the graphite is too small, the specific density of the negative electrode plate in a fully charged battery is preferably not smaller than 170 Ah/kg and not larger than 250 Ah/kg, and more preferably not smaller than 200 Ah/kg and not larger than 230 Ah/kg. It should be noted that the specific density of the negative electrode plate can be calculated in such a manner that a weight W of the carbon material comprised in a portion of the negative electrode material mixture layer, the portion facing the positive electrode, is determined and then the battery. capacity (nominal capacity) is divided by the weight W of the carbon material.

When both a graphitizable carbon material and graphite are used and the percentage of the graphitizable carbon material content is not smaller than 50 wt % and not larger than 80 wt %, it is preferable that the specific density of the negative electrode plate in a fully charged battery be not smaller than 170 Ah/kg and not larger than 300 Ah/kg. When the specific density of the negative electrode plate is over 300 Ah/kg, it has a potential of exceeding the reversible specific density of the negative electrode plate. In this case, repetition of charge/discharge cycles may result in such a defect as deposition of metallic lithium on the surface of the negative electrode plate. When the specific density of the negative electrode plate in a fully charged battery is below 170 Ah/kg, on the other hand, the battery capacity extremely decreases and the battery voltage also decreases.

The process of graphitization of a carbon material starts with development of a crystallite in a c-axis direction Lc. At a stage where Lc has developed to have a certain thickness, a crystallite in an a-axis direction La starts to grow. Subsequently, as the graphitization proceeds, the thickness of La usually becomes larger than the thickness of Lc.

Both thicknesses of Lc and La of a carbon material can be expressed by a function of half width of a peak observed in an X-ray diffraction pattern. Both thicknesses of Lc and La can be determined by a general method known as Gakushin method (a method determined by the 117th committee in Japan Society for the Promotion of Science). In this method, a high-purity silicon powder as an internal standard material is mixed with a carbon material, the thicknesses of La and Lc of which are to be determined, and the X-ray diffraction pattern of the mixture is measured. In the obtained diffraction pattern, peaks of both carbon and silicon are recognized. From the half width of those peaks, the thickness of the crystallite can be determined. It is desirable that the thickness of Lc be determined from a peak attributed to a (004) crystal face and the thickness of La be determined from a peak attributed to a (110) crystal face.

It is preferable that the thickness Lc (004) of a crystallite in a c-axis direction Lc of a graphitizable carbon material be not smaller than 20 nm and smaller than 60 nm. When Lc (004) is below 20 nm, there are some cases where the graphite structure insufficiently develops. When Lc (004) is 60 nm or larger, on the other hand, there are some cases where the graphite structure overly develops to cause deterioration in charging capability of the negative electrode plate.

It is preferable that the thickness La (110) of a crystallite in an a-axis direction La of a graphitizable carbon material be smaller than Lc (004). When La (110) is equal to or larger than Lc (004), there are some cases where the graphite structure overly develops to cause deterioration in charging capability of the negative electrode plate.

As a raw material of a graphitizable carbon material, a material that can be made into a graphitizable carbon material having such physical properties as thus described can be used without any particular limitation. Further, a method for making a raw material into a graphitizable carbon material is not especially limited.

The graphitizable carbon material can be obtained for example in such a manner that cokes or mesophase spherules, which are produced in a heat-treatment process of an anisotropic pitch, are further heated.

It is preferable that the graphitizable carbon material have a spherical or massive shape to readily get the crystal edge exposed to the particle surface. Further, mesophase pitch-based carbon fiber, vapor grown carbon fiber, a carbon fiber having a radially developed carbon skeleton, or the like, can preferably be used. Those graphitizable carbon materials are capable of giving a negative electrode plate exerting high output power.

As the graphite that can be used in combination with the graphitizable carbon material, for example, natural graphite, artificial graphite or the like can be used. The artificial graphite can be obtained for example by heat-treating a raw carbon material at a high temperature of 2500° C. or higher. The use of graphite having a sufficiently developed three-dimensional layered structure is preferred.

It is preferable that the graphitizable carbon material have a mean particle size of 5 to 15 μm.

It is preferable that the graphite have a mean particle size of 5 to 15 μm.

It is preferable that the negative electrode material mixture layers on both faces of the negative electrode current collector have a total thickness of not smaller than 60 μm and not larger than 100 μm, according to the thickness of the positive electrode material mixture layer.

In the following, the present invention is specifically described based on examples; however, the present invention is not limited thereto.

EXAMPLE 1

(i) Positive Electrode

A lithium nickel composite oxide expressed by a composition formula: $LiNi_{0.7}Co_{0.2}Al_{0.1}O_2$, was used as the positive electrode active material. This composite oxide was prepared in the following manner.

First, a ternary hydroxide was prepared by a coprecipitation method. Specifically, a $NiSO_4$ aqueous solution was added with a sulfate salt of Co and a sulfate salt of Al in a predetermined ratio to prepare a saturated aqueous solution.

A sodium hydroxide aqueous solution was slowly added dropwise into the obtained saturated aqueous solution under stirring, to neutralize the saturated aqueous solution. In the saturated aqueous solution thus neutralized, a ternary hydroxide: $Ni_{0.7}Co_{0.2}Al_{0.1}(OH)_2$, was precipitated. This precipitation was filtrated, washed with water and then dried at 80° C. to obtain an hydroxide with a mean particle size of about 10 µm.

Subsequently, the obtained hydroxide was added with lithium hydroxide monohydrate such that the total atom number of Ni, Co and Al was equivalent to the atom number of Li. The resultant mixture was heat-treated in a dry air at 800° C. for ten hours to obtain an aimed lithium-nickel composite oxide: $LiNi_{0.7}Co_{0.2}Al_{0.1}O_2$.

According to the powder X-ray diffraction method, the obtained lithium-nickel composite oxide had a single-phase hexagonal layered structure. Further, it was confirmed that Co and Al were incorporated in the crystal structure of the lithium-nickel composite oxide to form a solid solution. The lithium-nickel composite oxide was ground and classified, and used as a positive electrode active material.

100 parts by weight of the positive electrode active material was added with 3 parts by weight of acetylene black as the conductive agent, and then added with an N-methyl-2-pyrrolidone (NMP) solution of polyvinylidene fluoride (PVdF) as the binder, and mixed to give a positive electrode material mixture paste. The amount of PVDF used was 4 parts by weight per 100 parts by weight of the positive electrode active material. The positive electrode material mixture paste was then applied onto each face of an aluminum foil as the positive electrode current collector, and then dried. The applied film after the drying was rolled together with the current collector to give a positive electrode plate having a thickness of 75 µm, a width of the positive electrode material mixture layer of 41 mm and a length of 2800 mm. The total thickness of the positive electrode material mixture layers on both faces of the positive electrode current collector was 55 µm, and the electrode area of the positive electrode plate was 1148 cm².

(ii) Negative Electrode Plate

A bulk coke having been produced in the heat-treatment process of an anisotropic pitch was heat-treated under an argon atmosphere at 1900° C. to obtain an aimed graphitizable carbon material having a mean particle size of about 10 µm.

The obtained graphitizable carbon material was subjected to the powder X-ray diffraction measurement to determine a spacing (d002) between (002) crystal faces, Lc (004) and La (110). Those values were calculated by Gakushin method using a high-purity silicon powder as an internal standard substance. Further, the wide range X-ray diffraction measurement of the graphitizable carbon material was conducted by means of CuKα rays to determine a ratio of IX (101)/IX (100) in the diffraction pattern. This peak intensity ratio was determined after sufficient elimination of background from the diffraction pattern. The results are shown below:

(d002): 0.340 nm
Lc (004): 30 nm
La (110): 25 nm
IX (101)/IX (100) ratio: 0.65

The X-ray diffraction pattern obtained here with 2θ in the range of 40 to 50 degrees is shown in FIG. 1(a). A peak attributed to the (100) crystal face is recognized at about 42 degrees, and a peak attributed to the (101) crystal face is slightly recognized at about 44 degrees.

100 parts by weight of the graphitizable carbon material was added with the NMP solution of PVdF, and mixed to give a negative electrode material mixture paste. The amount of PVDF used was 8 parts by weight per 100 parts by weight of the graphitizable carbon material. The negative electrode material mixture paste was then applied onto each face of a copper foil as the negative electrode current collector, and then dried. The applied film after the drying was rolled together with the current collector to give a negative electrode plate having a thickness of 110 µm, a width of the negative electrode material mixture layer of 46 mm and a length of 2910 mm. The total thickness of the negative electrode material mixture layers on both faces of the negative electrode current collector was 95 µm.

(iii) Assembly of Battery

The positive electrode plate and the negative electrode plate were spirally wound via a polyethylene-made microporous separator having a thickness of 27 µm and a width of 50 mm, to constitute a cylindrical electrode plate assembly. This electrode plate assembly was housed into a battery case with a diameter of 32 mm and a height of 61.5 mm. A battery nominal capacity was designed here such that the negative electrode plate in a fully charged state had a specific density of 200 Ah/kg.

As the non-aqueous electrolyte used was a solution obtained by dissolving 1 mol/L of lithium hexafluoro phosphate ($LiPF_6$) as the solute into a mixture of ethylene carbonate (EC), dimethyl carbonate (DMC) and ethyl methyl carbonate (EMC) in a volume ratio of 3:4:3 as the solvent.

The electrode plate assembly was impregnated with the non-aqueous electrolyte and the battery case was then sealed to complete a battery of EXAMPLE 1.

COMPARTIVE EXAMPLE 1

An isotopic pitch as the law material was heat-treated to obtain a non-graphitizable carbon. Except that the non-graphitizable carbon was used in place of the graphitizable carbon material for the negative electrode plate, a battery was fabricated in the same conditions as the battery of EXAMPLE 1, and referred to as a battery of COMPARATIVE EXAMPLE 1.

It is to be noted that a spacing (d002) between (002) crystal faces determined by the powder X-ray diffraction method was 0.370 nm. Because non-graphitizable carbon had a turbostratic structure, it was impossible to measure Lc (004) and La (110).

In a wide-range X-ray diffraction pattern of the non-graphitizable carbon measured by means of CuKα rays, only a broad diffraction image was observed at around 42 to 44 degrees, and the structure was completely turbostratic. The X-ray diffraction pattern obtained here with 2θ in the range of 40 to 50 degrees is shown in FIG. 1(b).

COMPARATIVE EXAMPLE 2

A bulk coke was heat-treated under an argon atmosphere at 2800° C. to obtain a graphite material having a mean particle size of about 10 µm. Except for the use of this graphite material, a battery was fabricated in the same conditions as the battery of EXAMPLE 1, and referred to as a battery of COMPARATIVE EXAMPLE 2.

(d002), Lc (004), La (110) and an IY (101)/IY (100) ratio were determined in the same manner as in EXAMPLE 1, which are shown below:

(d002): 0.335 nm
Lc (004): 100 nm
La (110): 150 nm
IY (101)/IY (100) ratio: 1.98

As above shown, the IY (101)/IY (100) ratio was as large as 1.98, indicating that the hexagonal structure of the graphite has developed to be three-dimensional.

The X-ray diffraction pattern obtained here with 2θ in the range of 40 to 50 degrees is shown in FIG. 1(c).

Evaluation 1

The batteries of EXAMPLE 1 and COMPARATIVE EXAMPLES 1 and 2 went trough three cycles of charge/discharge under an environment at 25° C. in the below-listed conditions. As a result, the obtained capacities of the respective batteries were all within the range of 1.8 to 2.0 Ah.

Constant current in charging: 400 mA
Upper limit voltage in charging: 4.2 V
Constant current in discharging: 400 mA
Lower limit voltage in discharging: 2.5 V For measurement of direct current internal resistance (DC-IR) of these batteries, a current-voltage characteristic test was conducted according to the following procedure.

First, each of the batteries was charged at a constant current so as to be in a 60% state of charge (SOC) under an environment at 25° C.

Figure 2:
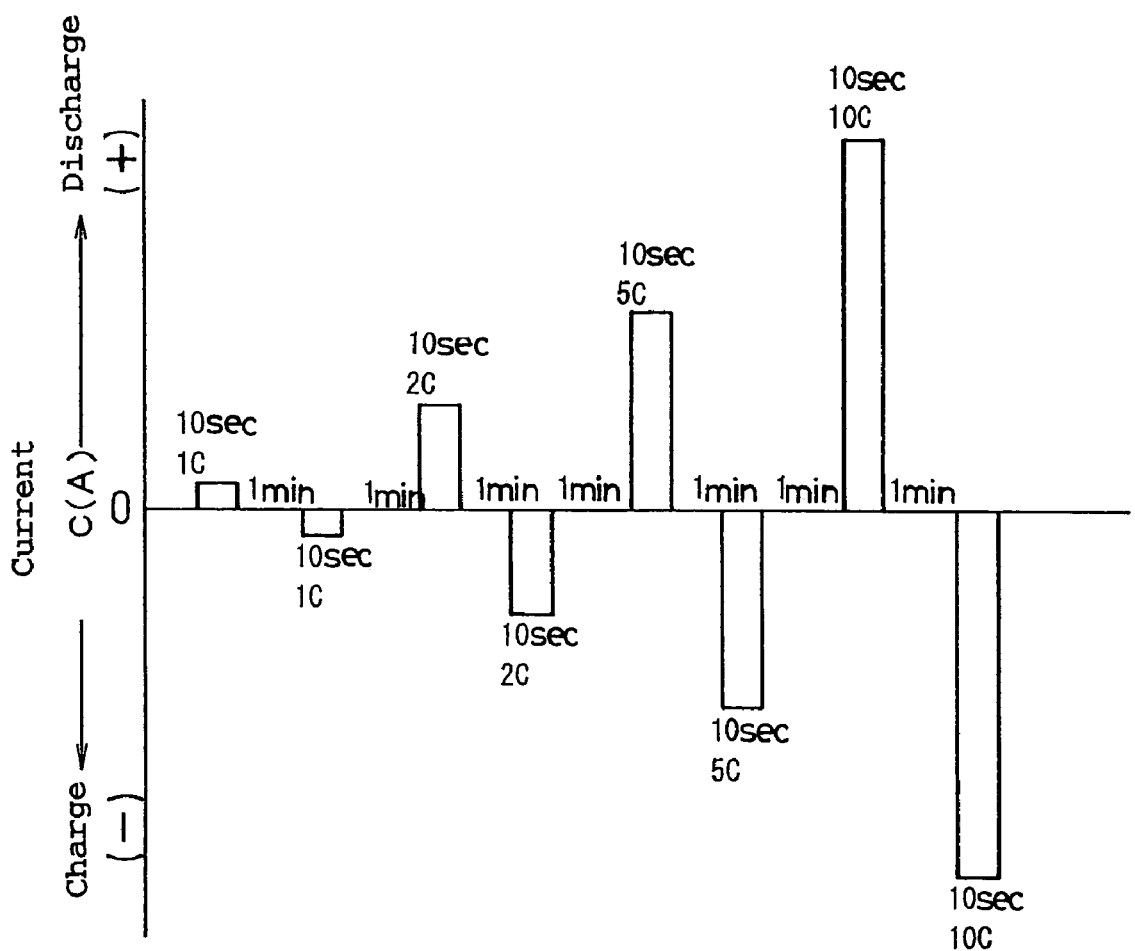
FIG. 2 is a graph showing a pulse pattern repeated in a current-voltage characteristic test.

Subsequently, a discharge pulse and a charge pulse were repeated, as shown in FIG. 2. A voltage was measured at the point of ten seconds after the application of each of the discharge pulses and the obtained voltage values were plotted with respect to current values.

Figure 3:
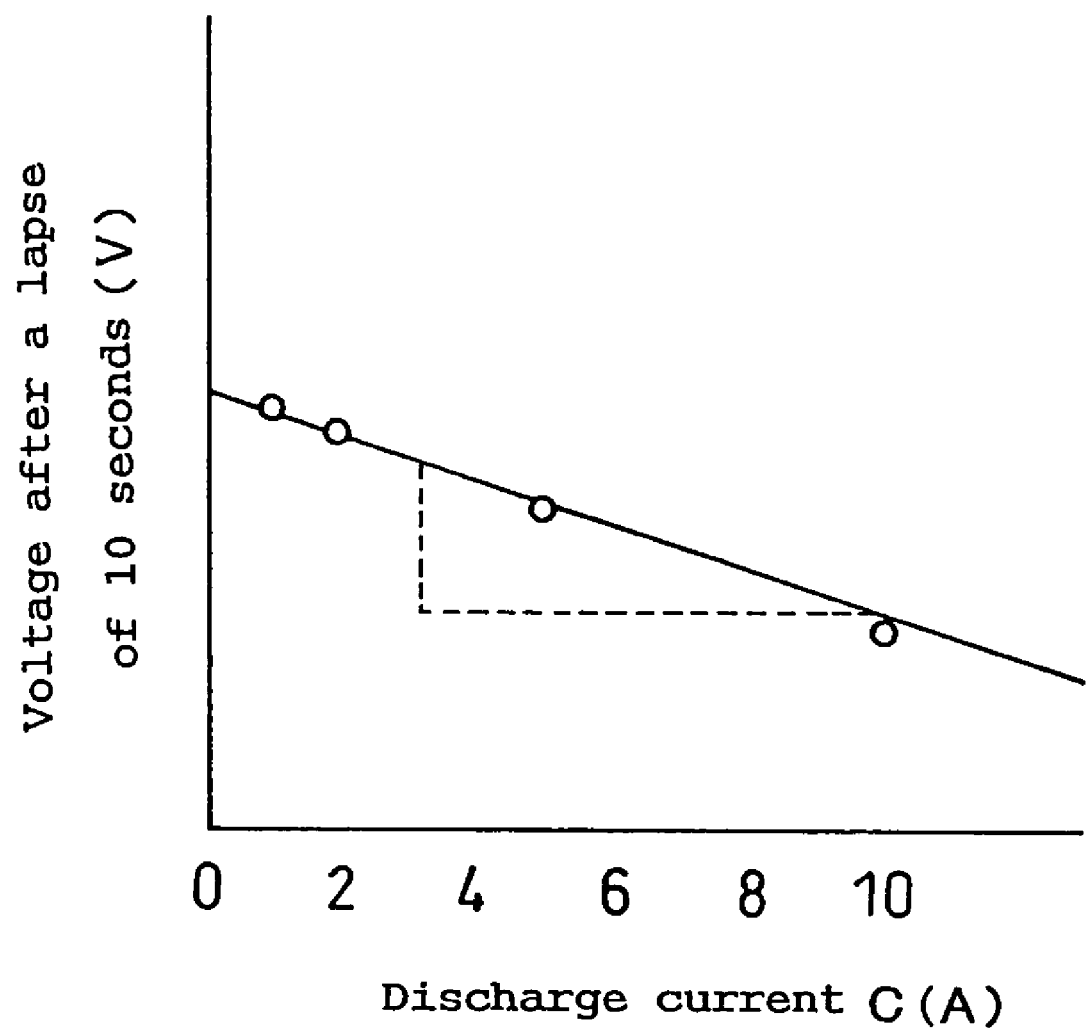
FIG. 3 is a graph showing a calculation method of direct current internal resistance of a battery.

Next, an approximate straight line was determined by applying the least-square method to each plot, as shown in FIG. 3. The slope value of the approximate straight line was taken as a direct current internal resistance (DC-IR). For example, the DC-IR of the battery of EXAMPLE 1 was 10.8 mΩ.

The batteries that had been subjected to the DC-IR measurement were subjected to two kinds of pulse cycle life characteristic tests as follows.

(1) Test on Cycle Life Characteristic with a High-load Charge Pulse

Figure 4:
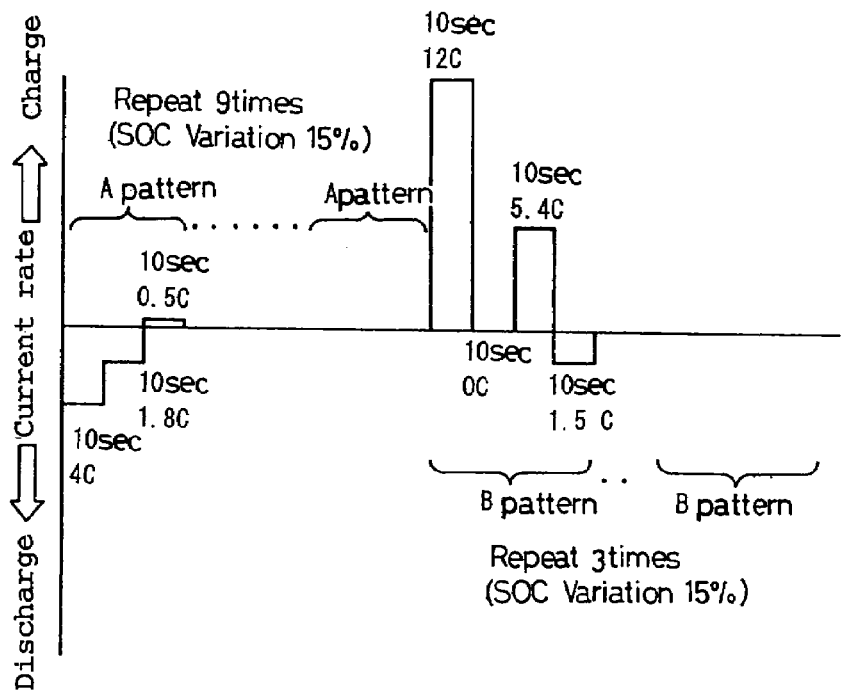
FIG. 4 is a graph showing a pulse pattern in a test on a cycle life characteristic with a high-load charge pulse.

As shown in FIG. 4, after the "A pattern" including a discharge pulse with the largest current of 4C had been repeated nine times, the "B pattern" including a charge pulse with the largest current of 12C was repeated three times. Herein, the battery was controlled such that the SOC thereof varied theoretically from 45% to 60%. According to this pulse waveform lasting 390 seconds per 1 cycle, a cycle test was conducted under an environment at 40° C.

(2) Test on Cycle Life Characteristic with a High-load Discharge Pulse

Figure 5:
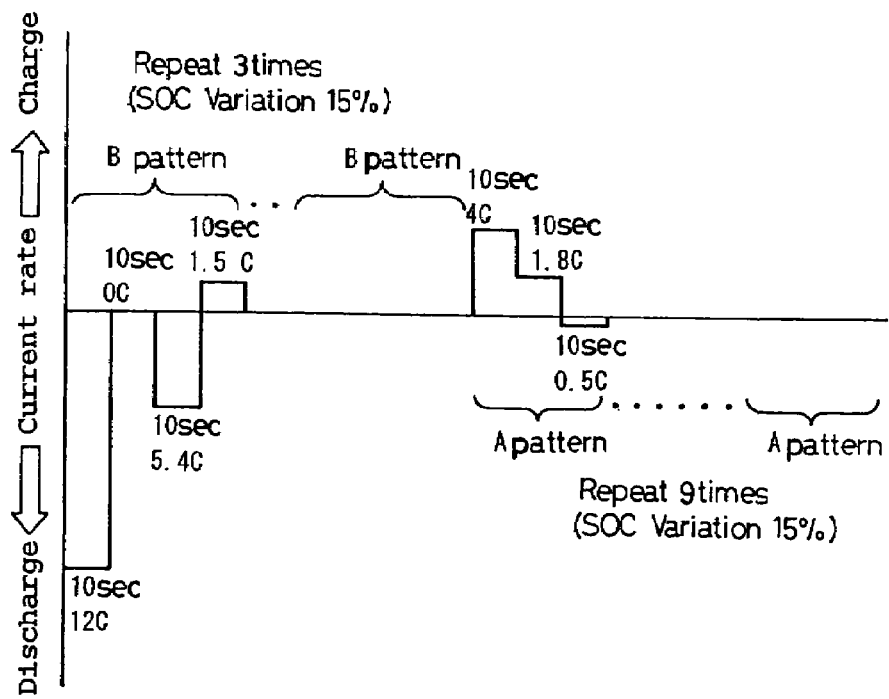
FIG. 5 is a graph showing a pulse pattern in a test on a cycle life characteristic with a high-load discharge pulse.

As shown in FIG. 5, after the "B pattern" including a discharge pulse with the largest current of 12C had been repeated three times, the "A pattern" including a charge pulse with the largest current of 4C was repeated nine times. Herein, the battery was controlled such that the SOC thereof varied theoretically from 45% to 60%. According to this pulse waveform lasting 390 seconds per 1 cycle, a cycle test was conducted under an environment at 40° C.

One battery each of the respective batteries of EXAMPLE 1 and COMPARATIVE EXAMPLES 1 and 2 was subjected to the aforementioned two kinds of pulse cycle life characteristic tests. The batteries were returned to the environment at 25° C. at every 3000th cycle to measure charge/discharge capacities and DC-IR of the batteries.

Figure 6:
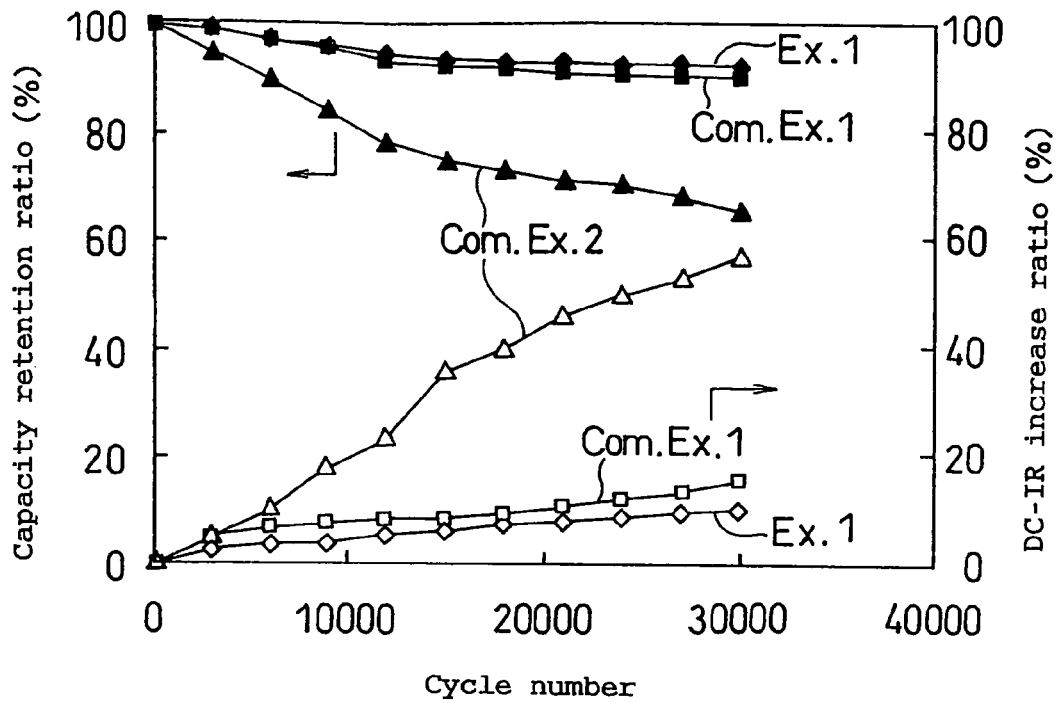
FIG. 6 is a graph showing the respective cycle life characteristics with high-load charge pulses of the batteries in EXAMPLE 1 and COMPARTIVE EXAMPLES 1 and 2.
Figure 7:
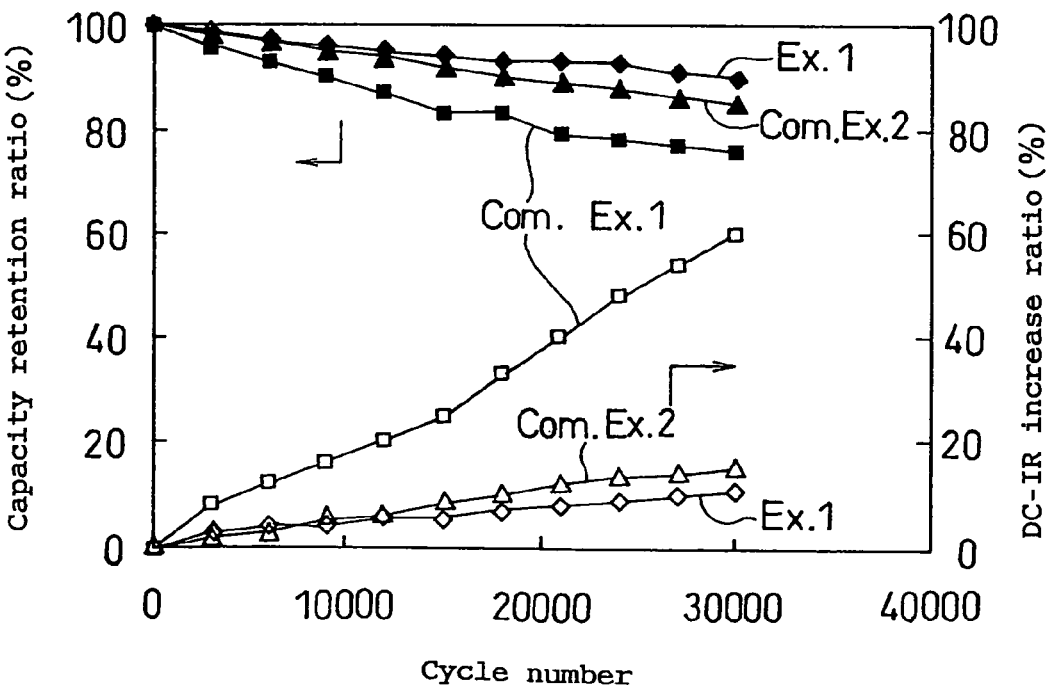
FIG. 7 is a graph showing the respective cycle life characteristics with high-load discharge pulses of the batteries in EXAMPLE 1 and COMPARATIVE EXAMPLES 1 and 2.

The relationships between a capacity retention ratio (ratio of the measured capacity to the initial capacity) and the DC-IR increase ratio (increased percentage of DC-IR from the initial value), going with cycles, are shown in FIGS. 6 and 7.

FIG. 6 shows a cycle life characteristic with a high-load charge pulse.

The battery of EXAMPLE 1 (Ex.1) exhibits a small decrease in capacity thereof even at the 30000th cycle and a DC-IR increase ratio of about 10%, indicating that high output power is maintained.

The battery of COMPARATIVE EXAMPLE 1 (Com.Ex.1) also exhibits a high capacity retention ratio and relatively a small DC-IR increase ratio of about 15%.

On the other hand, as for the battery of COMPARATIVE EXAMPLE 2 (Com.Ex.2), the capacity noticeably decreases with cycles, the DC-IR increase ratio is large and the output power of the battery decreases significantly. This is due to the use of the carbon material with a high graphitization degree for the negative electrode, presumably causing the negative electrode plate to have an insufficient charging capability with respect to the high-load charge pulse.

FIG. 7 shows a cycle life characteristic with a high-load discharge pulse.

The battery of EXAMPLE 1 exhibits a favorable cycle characteristic as in the case of the cycle life characteristic with a high-load charge pulse.

However, as for the battery of COMPARATIVE EXAMPLE 1, unlike the result of the cycle life characteristic with a high-load charge pulse, the capacity decreases drastically, and in particular, the DC-IR increases, i.e. the output power decreases, significantly. This is due to the use of the non-graphitizable carbon material for the negative electrode, whereby the negative electrode plate has low conductivity and cannot sufficiently respond to the high-load discharge pulse.

As for the battery of COMPARATIVE EXAMPLE 2 using the carbon material with a high graphitization degree, on the other hand, the negative electrode plate has such high conductivity as to be able to respond to the high-load discharge pulse easily and to have a relatively favorable cycle characteristic.

As thus described, the battery of EXAMPLE 1, using the graphitizable carbon material with the ratio of IX (101)/IX (100) of 0.65, has excellent characteristics with respect to both a high-load charge pulse and a high-load discharge pulse. It is therefore found that, when the battery of the present invention is for example used for HEVs, the battery can support any driving mode and have an excellent cycle life.

On the other hand, in the case of the battery of COMPARTIVE EXAMPLE 1 using the non-graphitizable carbon material, and the battery of COMPARATIVE EXAMPLE 2 using the carbon material with a high graphitization degree, great deterioration may be induced depending on the load pattern of the pulse. When those batteries are used for HEVs, therefore, it is hard to obtain sufficient characteristics.

EXAMPLE 2

A lithium nickel composite oxide expressed by a composition formula: $LiNi_{0.8}Co_{0.1}Mn_{0.1}O_2$, was used as the positive electrode active material. This composite oxide was prepared in the following manner.

First, a ternary hydroxide was prepared by a coprecipitation method. Specifically, a $NiSO_4$ aqueous solution was added with a sulfate salt of Co and a sulfate salt of Mn in a predetermined ratio to prepare a saturated aqueous solution. A sodium hydroxide aqueous solution was slowly added dropwise into the obtained saturated aqueous solution, under stirring, to neutralize the saturated aqueous solution. In the saturated aqueous solution thus neutralized, a ternary hydroxide: $Ni_{0.8}Co_{0.1}Mn_{0.1}(OH)_2$, was precipitated. This precipitation was filtrated, washed with water and then dried at 80° C.

Subsequently, the obtained hydroxide was added with lithium hydroxide monohydrate such that the total atom number of Ni, Co and Mn was equivalent to the atom number of Li. The resultant mixture was heat-treated in a dry air at 850° C. for ten hours to obtain an aimed lithium-nickel composite oxide: $LiNi_{0.8}Co_{0.1}Mn_{0.1}O_2$.

According to the powder X-ray diffraction method, the obtained lithium-nickel composite oxide had a single-phase hexagonal layered structure. Further, it was confirmed that. Co and Mn were incorporated in the crystal structure of lithium-nickel composite oxide to form a solid solution.

Except that this lithium-nickel composite oxide was ground and classified, and used as a positive electrode active material, a positive electrode plate was produced in the same conditions as the battery of EXAMPLE 1.

As the carbon material to be used for the negative electrode plate, nine kinds of materials with different graphitization levels as shown in Table 1 were prepared. Except for the use of those carbon materials, negative electrode plates were produced in the same conditions as the battery of EXAMPLE 1.

Except that the aforementioned positive electrode plate and negative electrode plate were used, batteries A1 to I1 were fabricated in the same conditions as the battery of EXAMPLE 1. The physical properties of the carbon materials used for the negative electrode plates are shown in Table 1.

TABLE 1

| Battery | Negative electrode carbon material | I(101)/ I(100) | Lc(004) (nm) | La(110) (nm) |
|---|---|---|---|---|
| A1 | Mesophase carbon | 0 | 10 | — |
| B1 | Vapor grown carbon fiber | 0.5 | 20 | 10 |
| C1 | Bulk coke | 0.68 | 32 | 25 |
| D1 | Mesophase carbon | 0.73 | 40 | 50 |
| E1 | Needle coke | 0.78 | 50 | 45 |
| F1 | Mesophase carbon | 0.8 | 52 | 45 |
| G1 | Mesophase pitch-based carbon fiber | 0.95 | 55 | 50 |
| H1 | MCMB | 1.0 | 60 | 55 |
| I1 | Bulk coke | 1.1 | 70 | 100 |

MCMB: Meso carbon microbeads

Evaluation 2

The batteries A1 to I1 were subjected to the same test on cycle life with a high-load charge pulse and the same test on cycle life with a high-load discharge pulse as in EXAMPLE 1. The capacity retention ratio and the DC-IR increase ratio at the 30000th cycle of each of those batteries are shown in Table 2.

TABLE 2

| | High-load charge pulse cycle | | High-load discharge pulse cycle | |
|---|---|---|---|---|
| Battery | Capacity retention ratio (%) | DC-IR increase ratio (%) | Capacity retention ratio (%) | DC-IR increase ratio (%) |
| A1 | 79 | 35 | 72 | 65 |
| B1 | 95 | 20 | 90 | 18 |
| C1 | 97 | 18 | 93 | 14 |
| D1 | 79 | 32 | 88 | 25 |
| E1 | 92 | 19 | 90 | 14 |
| F1 | 86 | 23 | 92 | 15 |
| G1 | 85 | 26 | 92 | 15 |
| H1 | 70 | 46 | 90 | 22 |
| I1 | 65 | 48 | 90 | 18 |

In Table 2, the batteries B1, C1, E1, F1 and G1 are favorable in terms of both cycle life characteristics with charge/discharge pulses. Namely, when a carbon material with the ratio of I (101)/I (100) in the range not larger than 0.95 is used for the negative electrode, improvement in pulse cycle life characteristic is recognized As for the carbon material used for the negative electrode plate of the battery A1, no peak attributed to the (101) crystal face was recognized. It is considered therefrom that no graphite layered structure has been formed in the carbon material for the battery A1 and thus the conductivity thereof is low. Therefore, deterioration especially in cycle life characteristic with a high-load discharge pulse is significant.

As for the batteries H1 and I1 with relatively high graphitization levels, the charging capability deteriorates and there is a tendency not to satisfy the cycle life characteristic with a high-load charge pulse. It is found from Tables 1 and 2 that the I (101)/I (100) value is required to be smaller than 1.0, preferably not larger than 0.8, and particularly preferably not larger than 0.7.

As for the battery D1, although the I (101)/I (100) value is 0.73, the resultant cycle life characteristic with a high-load charge pulse is slightly inferior. As to the carbon material used for the battery D1, La (110) value is larger than the Lc (004) value. It can thus be thought that the crystallite in the a-axis direction develops to an excessive degree to cause deterioration in charging capability. It is therefore desirable that, in the carbon material for use in the negative electrode plate, the La (110) value be smaller than the Lc (004) value.

EXAMPLE 3

As shown in Table 3, the same positive electrode plate was produced as in EXAMPLE 1, except for changes in the total thickness of the positive electrode material mixture layers carried on both faces of the positive electrode current collector, the positive electrode material mixture density and the length of the positive electrode plate. Further, the same negative electrode plate was produced as in EXAMPLE 1 except that the thickness and length of the negative electrode plate were changed according to those of the positive electrode plate.

Batteries J1 to P1 were fabricated in the same conditions as in EXAMPLE 1, except for the use of the aforementioned positive electrode plate and negative electrode plate. Herein, all the batteries had a negative electrode specific density in a fully charged state in the range of 190 to 210 Ah/kg.

TABLE 3

| Battery | Positive electrode configuration | | | |
|---|---|---|---|---|
| | Material mixture layer (μm) | Material mixture density (g/cc) | Electrode plate length (mm) | *A |
| J1 | 30 | 3.3 | 3900 | 1066 |
| K1 | 40 | 3.3 | 3400 | 800 |
| L1 | 55 | 3.3 | 2800 | 574 |
| M1 | 70 | 3.3 | 2300 | 530 |
| N1 | 100 | 2.7 | 1900 | 520 |
| O1 | 100 | 3.3 | 1900 | 320 |
| P1 | 120 | 3.3 | 1600 | 262 |

*A: Electrode area per battery capacity of 1 Ah ($cm^2$)

Evaluation 3

The batteries J1 to P1 were subjected to the same test on cycle life with a high-load charge pulse as in EXAMPLE 1. The capacity retention ratio and the DC-IR increase ratio at the 30000th cycle of each of those batteries are shown in Table 4.

TABLE 4

| Battery | Capacity retention ratio (%) | DC-IR increase ratio (%) |
|---|---|---|
| J1 | 74 | 48 |
| K1 | 94 | 13 |
| L1 | 95 | 12 |
| M1 | 90 | 18 |
| N1 | 87 | 23 |
| O1 | 71 | 45 |
| P1 | 66 | 52 |

It is found from Table 4 that the batteries K1, L1, M1 and N1 exhibit favorable pulse life characteristics. This result indicates the need that the total thickness of the positive electrode material mixture layers carried on both faces of the positive electrode current collector be in the range of 40 to 100 μm. It also reveals that the electrode area of the positive electrode plate per battery capacity of 1 Ah needs to be in the range of 520 to 800 $cm^2$.

While the mixture layers of the positive electrode plates of the batteries N1 and O1 have the equivalent thickness and length, the positive electrode plate of the battery N1 is designed to have a smaller material mixture density than the battery O1. For this reason, the battery N1 has a smaller battery capacity and a larger electrode area of the positive electrode plate per battery capacity, as compared with the battery O1. A favorable pulse cycle life characteristic is not obtained in the battery O1 where the electrode area of the positive electrode plate per battery capacity is smaller. Taking the battery capacity into consideration, therefore, it can be said that the material mixture layer of the positive electrode plate favorably has a thickness in the range of 40 to 70 μm.

EXAMPLE 4

The same positive electrode plate as in EXAMPLE 1 was produced. And the same negative electrode was produced except for the change in the thickness thereof. Batteries Q1 to V1 were fabricated in the same conditions as in EXAMPLE 1, except that the negative electrode specific density in a fully charged state was changed as shown in Table 5, by changing the thickness of the negative electrode plate.

Evaluation 4

The batteries Q1 to V1 were subjected to the same test on cycle life with a high-load charge pulse as in EXAMPLE 1. The capacity retention ratio and the DC-IR increase ratio at the 30000th cycle of each of those batteries are shown in Table 5.

TABLE 5

| Battery | *B | Capacity retention ratio (%) | DC-IR increase ratio (%) |
|---|---|---|---|
| Q1 | 150 | 81 | 38 |
| R1 | 170 | 91 | 15 |
| S1 | 200 | 92 | 12 |
| T1 | 230 | 92 | 13 |
| U1 | 250 | 88 | 20 |
| V1 | 270 | 70 | 58 |

*B: Negative electrode specific density in a fully charged state (Ah/kg)

In Table 5, the batteries R1 to U1 indicate relatively favorable pulse cycle life characteristics. It is apparent therefrom that the specific density of the negative electrode in a fully charged state is preferably not smaller than 170 Ah/kg and not larger than 250 Ah/kg.

On the other hand, the battery V1 with the specific density of the negative electrode in a fully charged state of 270 Ah/kg had a significantly deteriorated capacity as well as a significantly increased DC-IR increase ratio. This is because the specific density of the negative electrode in a fully charged state exceeds the specific density for reversible charge/discharge of the carbon material of the negative electrode plate. The charging capability during high-load charge is thus considered as being insufficient.

On the other hand, as for the battery Q1 designed to be low-loaded, having a negative electrode specific density in a fully charged state of 150 Ah/kg, most of lithium is not intercalated into the spacing between graphite layers during charge. It is therefore thought that the negative electrode deteriorates noticeably since the charge/discharge reactions proceed only in an irreversible reaction site.

It is found important from the above results not only to regulate physical properties of the carbon material to be used for the negative electrode plate, but to optimize battery design. It is also found that a battery excellent in cycle life can be obtained by optimizing the combination of the physical properties of the carbon material and the battery design.

As thus described, even in the case of repeating a large current charge/discharge pulse for a long period of time, it is possible to minimize deterioration in capacity and an increase in internal resistance so that a non-aqueous electrolyte secondary battery with excellent cycle life can be provided.

EXAMPLE 5

(i) Positive Electrode Plate

The same positive electrode plate as in EXAMPLE 1 was produced except that the length was 2870 mm and the electrode area was 1177 $cm^2$.

(ii) Negative Electrode Plate

A mixed carbon material of the graphitizable carbon material used in EXAMPLE 1 (hereinafter referred to as the graphitizable carbon material "a") and the graphite used in COMPARATIVE EXAMPLE 2 (hereinafter referred to as the graphite "d") in a weigh ratio of 7:3 was prepared.

100 parts by weight of the aforementioned mixed carbon material was added with an NMP solution of PVdF, and mixed to give a negative electrode material mixture paste. The amount of PVdF used was 8 parts by weight per 100 parts by weight of the mixed carbon material. The negative electrode material mixture paste was then applied onto each face of a copper foil as the negative electrode current collector, and then dried. The applied film after the drying was rolled together with the current collector to give a negative electrode plate having a thickness of 110 µm, a width of the negative electrode material mixture layer of 46 mm and a length of 2980 mm. The total thickness of the negative electrode material mixture layers on both faces of the negative electrode current collector was 95 µm.

(iii) Assembly of Battery

Except that the positive electrode plate and negative electrode plate as thus obtained were used, a battery A2 with a nominal capacity of 2.0 Ah and a specific density of the negative electrode in a fully charged state of about 270 Ah/kg was fabricated in the same conditions as in EXAMPLE 1.

EXAMPLE 6

Iron was used as a catalyst, and toluene or benzene was cracked in gas phase at 1000° C. for carbonization and was further heat-treated at 1900° C. to obtain a graphitizable carbon material "b" as a vapor grown carbon fiber.

The graphitizable carbon material "b" was mixed with the graphite "d" in a weight ratio of 7:3 to obtain a mixed carbon material. Except for the use of this mixed carbon material for the negative electrode, a battery B2 was fabricated in the same manner as in EXAMPLE 5.

(d002), Lc (004), La (110) and an I (101)/I (100) ratio were determined in the same manner as in EXAMPLE 1, which are shown below:
(d002): 0.340 nm
Lc (004): 20 nm
La (110): 10 nm
I (101)/I (100) ratio: 0.5

EXAMPLE 7

An anisotropic pitch was heat-treated at 400° C. to obtain mesophase spherules. The mesophase spherules were then separated from the pitch matrix, carbonized at 1000° C., and further heat-treated at 1900° C. to obtain mesophase carbon, which is referred to as a graphitizable carbon material "c".

The graphitizable carbon material "c" was mixed with the graphite "d" in a weight ratio of 7:3 to obtain a mixed carbon material. Except for the use of this mixed carbon material for the negative electrode, a battery C2 was fabricated in the same manner as in EXAMPLE 5.

(d002), Lc (004), La (110) and an I (101)/I (100) ratio were determined in the same manner as in EXAMPLE 1, which are shown below:
(d002): 0.340 nm
Lc (004): 52 nm
La (110): 45 nm
I (101)/I (100) ratio: 0.8

COMPARATIVE EXAMPLE 3

A battery D2 was fabricated in the same manner as in EXAMPLE 5 except that the non-graphitizable carbon material used in COMPARATIVE EXAMPLE 1 was singly used for the negative electrode.

COMPARATIVE EXAMPLE 4

A battery E2 was fabricated in the same manner as in EXAMPLE 5 except that the graphite "d" used in COMPARATIVE EXAMPLE 2 was singly used for the negative electrode.

EXAMPLE 8

A battery F2 was fabricated in the same manner as in EXAMPLE 5 except that the graphitizable carbon material "a" used in EXAMPLE 1 was singly used for the negative electrode.

The kinds and the compositions of the carbon materials used for the negative electrode of the batteries of EXAMPLES 5 to 8 and COMPARATIVE EXAMPLES 3 and 4, as well as the I (101)/I (100) ratios of the carbon materials with a higher mixed ratio, are shown in Table 6.

TABLE 6

| Battery | Negative electrode carbon material (Mixed ratio (wt %)) | | I(101)/ I(100)* |
|---|---|---|---|
| A2 | Graphitizable carbon material "a" (70) | Graphite "d" (30) | 0.65 |
| B2 | Graphitizable carbon material "b" (Vapor grown carbon fiber) (70) | Graphite "d" (30) | 0.5 |
| C2 | Graphitizable carbon material "c" (Mesophase carbon) (70) | Graphite "d" (30) | 0.8 |
| D2 | Non-graphitizable carbon material (100) | | Impossible to measured |
| E2 | | Graphite "d" (100) | 1.98 |
| F2 | Graphitizable carbon material "a" (100) | | 0.65 |

*I(101)/I(100) ratio of carbon material with higher mixed ratio.

Evaluation 5

The batteries of EXAMPLES 5 to 8 and COMPARATIVE EXAMPLES 3 and 4 went trough three cycles of charge/discharge under an environment at 25° C. in the below-listed conditions. As a result, the obtained capacities of the respective batteries were all within the range of 1.8 to 2.0 Ah.

Constant current in charging: 400 mA
Upper limit voltage in charging: 4.2 V
Constant current in discharging: 400 mA
Lower limit voltage in discharging: 2.5 V For measurement of direct current internal resistance (DC-IR) of these batteries, a current-voltage characteristic test was conducted according to the following procedure.

First, each of the batteries was charged at a constant current so as to be in a 60% state of charge (SOC) under an environment at 25° C.

Subsequently, a discharge pulse and a charge pulse were repeated, as shown in FIG. 2. A voltage was measured at the point of 10 seconds after the application of each of the discharge pulses and the obtained voltage values were plotted with respect to current values.

Next, an approximate straight line was determined by applying the least-square method to each plot, as shown in FIG. 3. The slope value of the approximate straight line was taken as a direct current internal resistance (DC-IR). For example, the DC-IR of the battery A2 of EXAMPLE 5 was 10.5 mΩ.

The batteries that had been subjected to the DC-IR measurement were subjected to two kinds of pulse cycle life characteristic tests as follows.

(1) Test on Cycle Life Characteristic with a High-load Charge Pulse

Figure 8:
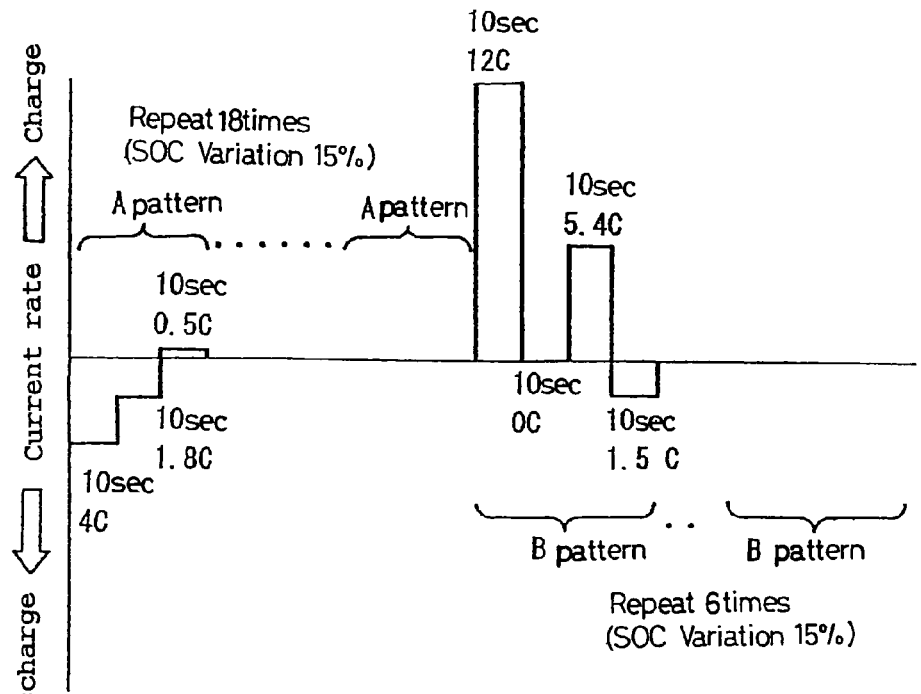
FIG. 8 is a graph showing a pulse pattern in a test on a cycle life characteristic with a high-load charge pulse.

As shown in FIG. 8, after the "A pattern" including a discharge pulse with the largest current of 4C had been repeated 18 times, the "B pattern" including a charge pulse with the largest current of 12C was repeated six times. Herein, the battery was controlled such that the SOC thereof varied theoretically from 40% to 70%. According to this pulse waveform lasting 780 seconds per 1 cycle, a cycle test was conducted under an environment at 40° C.

(2) Test on Cycle Life Characteristic with a High-load Discharge Pulse

Figure 9:
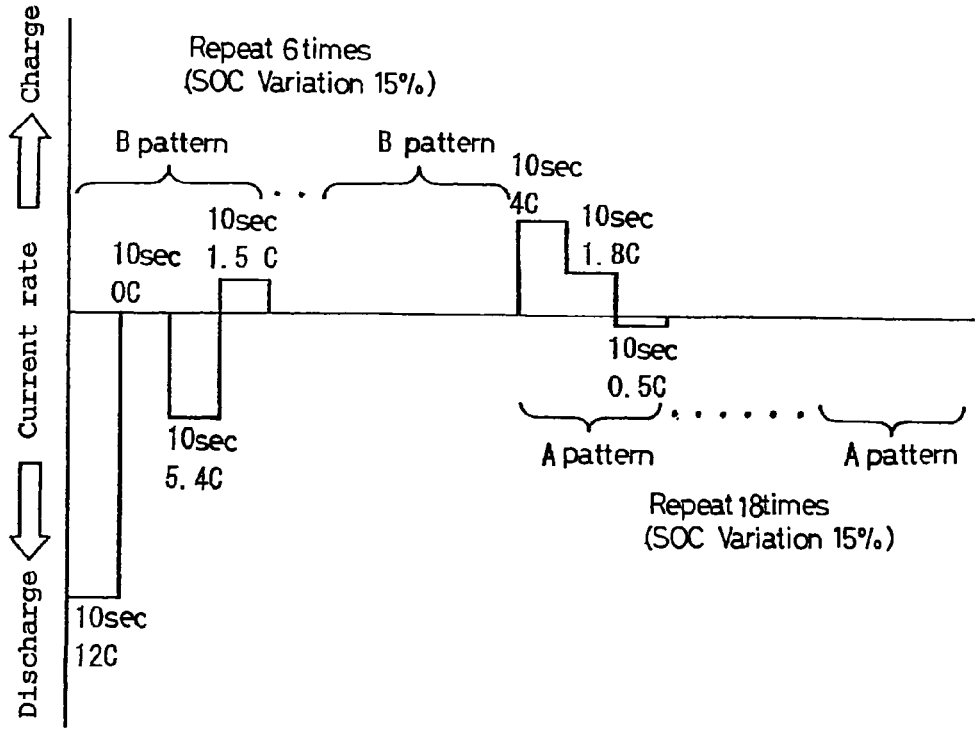
FIG. 9 is a graph showing a pulse pattern in a test on a cycle life characteristic with a high-load discharge pulse.

As shown in FIG. 9, after the "B pattern" including a discharge pulse with the largest current of 12C had been repeated six times, the "A pattern" including a charge pulse with the largest current of 4C was repeated 18 times. Herein, the battery was controlled such that the SOC thereof varied theoretically from 40% to 70%. According to this pulse waveform lasting 780 seconds per 1 cycle, a cycle test was conducted under an environment at 40° C.

One battery each of the respective batteries of EXAMPLES 5 to 8 and COMPARATIVE EXAMPLES 3 and 4 was subjected to the aforementioned two kinds of pulse cycle life characteristic tests. The batteries were returned to the environment at 25° C. at every 3000th cycle to measure charge/discharge capacities and DC-IR of the batteries.

Figure 10:
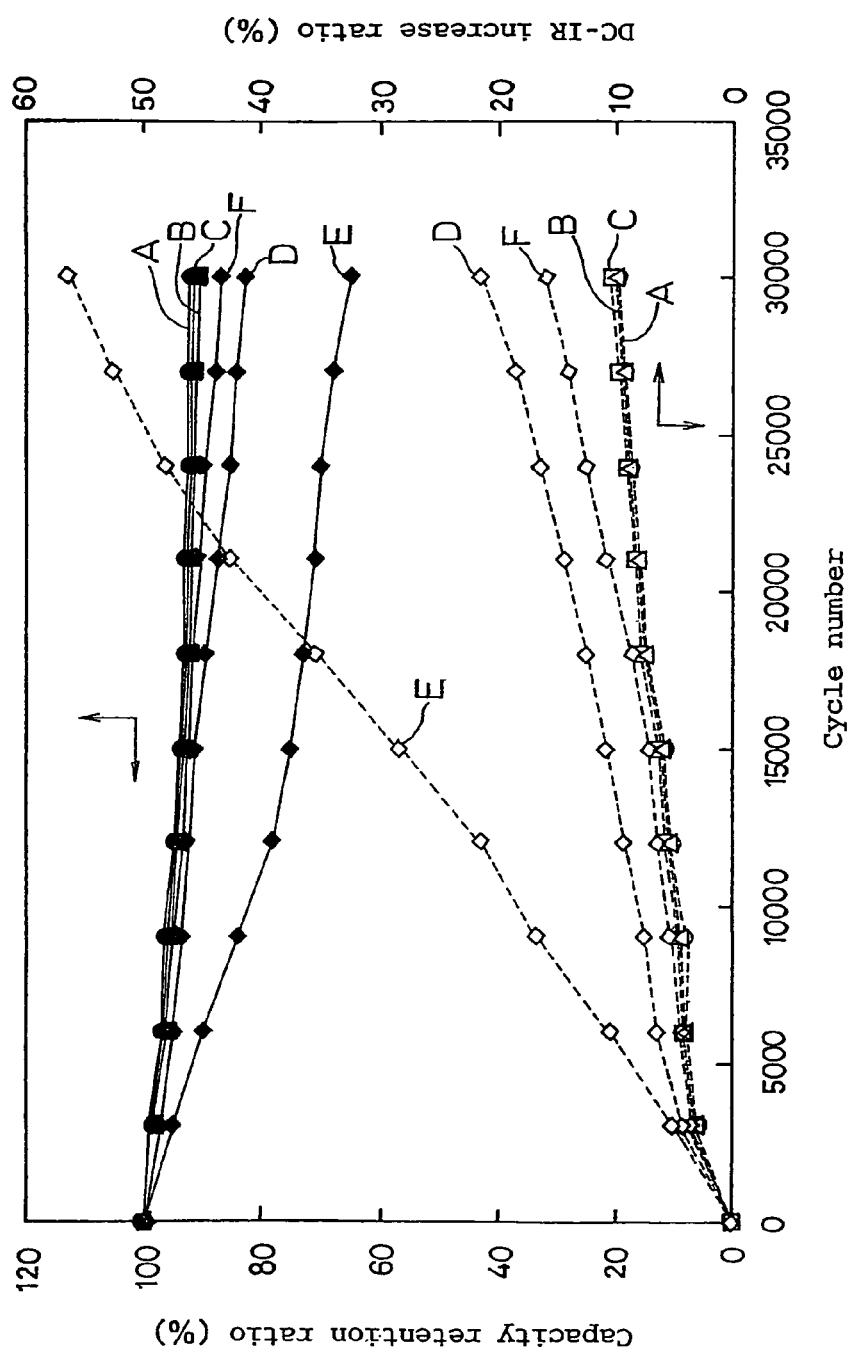
FIG. 10 is a graph showing the respective cycle life characteristics with high-load charge pulses of the batteries in EXAMPLES 5 to 8 and COMPARTIVE EXAMPLES 3 and 4.
Figure 11:
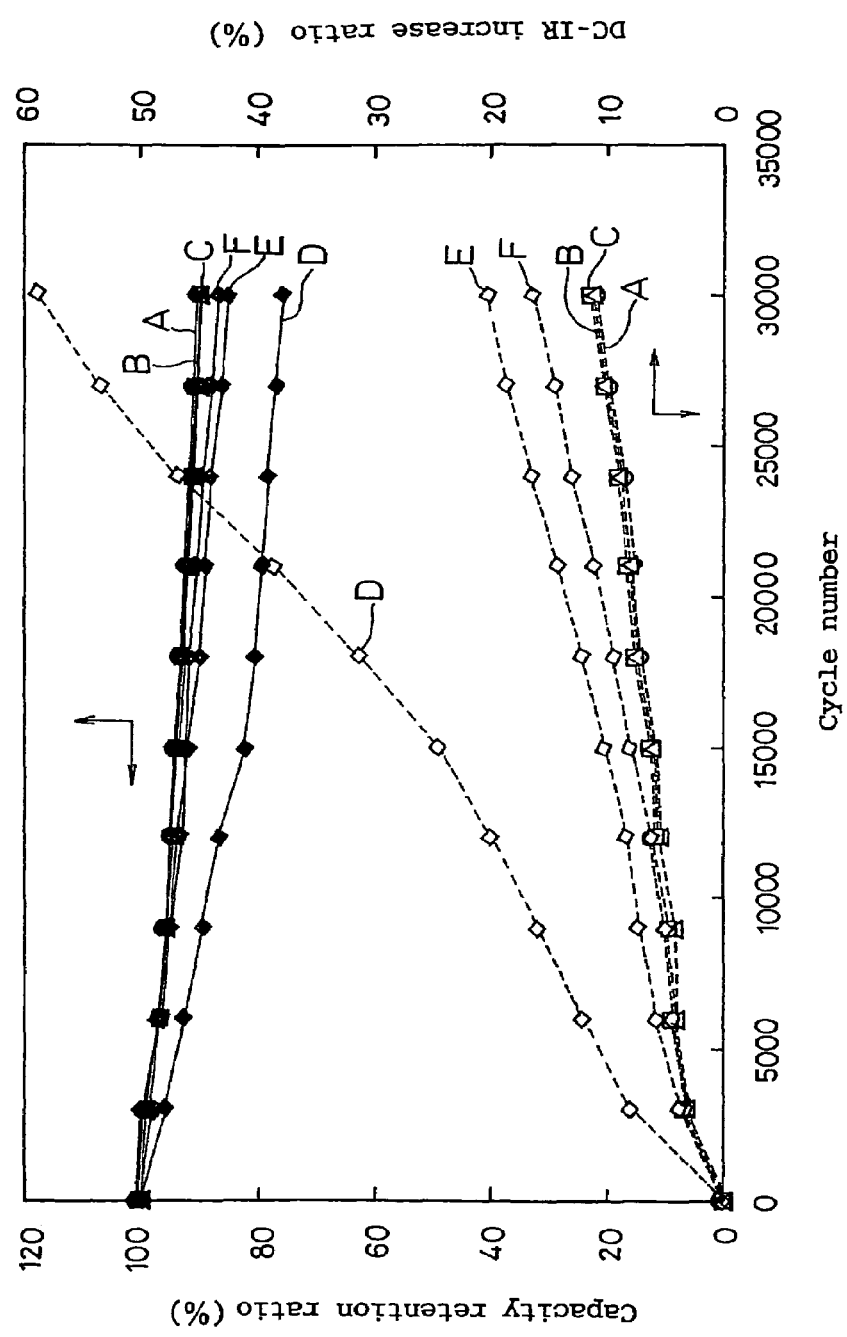
FIG. 11 is a graph showing the respective cycle life characteristics with high-load discharge pulses of batteries in EXAMPLES 5 to 8 and COMPARTIVE EXAMPLES 3 and 4.

The relationships between the capacity retention ratio and the DC-IR increase ratio are shown in FIGS. 10 and 11.

FIG. 10 shows a cycle life characteristic with a high-load charge pulse. FIG. 11 shows a cycle life characteristic with a high-load discharge pulse.

First, a cycle life characteristic with a high-load charge pulse is described.

Each of the batteries A2 to C2 (A to C in FIG. 10) of EXAMPLES 5 to 7 exhibits a small decrease in capacity even after 30000 charge/discharge cycles, and a DC-IR increase ratio of about 10%, indicating that high input/output power is maintained.

The battery D2 (D in FIG. 10) of COMPARATIVE EXAMPLE 3 and the battery F2 (F in FIG. 10) of EXAMPLE 8 had characteristics slightly inferior to those of the batteries A2 to C2 of EXAMPLES 5 to 7, but the capacity retention ratios of the batteries D2 and F2 are high and the DC-IR increase ratios are about 20%.

On the other hand, as for the battery E2 (E in FIG. 10) of COMPARATIVE EXAMPLE 4, the capacity noticeably decreases with cycles, the DC-IR increase ratio is large and the battery output power decreases significantly. This is because the carbon material with a high graphitization degree is used as the negative electrode active material, causing the negative electrode plate to have insufficient charging capability with respect to the high-load charge pulse.

Next, the cycle life characteristic with a high-load discharge pulse is described.

The batteries A2 to C2 (A to C in FIG. 11) of EXAMPLES 5 to 7 exhibit favorable cycle characteristics as in the case of the cycle life characteristic with a high-load charge pulse.

The battery E2 (E in FIG. 11) of COMPARATIVE EXAMPLE 4 and the battery F2 (F in FIG. 11) of EXAMPLE 8 have characteristics slightly inferior to those of the batteries A2 to C2 of EXAMPLES 5 to 7. However, since the negative electrodes of the batteries E2 and F2 are high in conductivity, those batteries are able to respond to the high-load discharge pulse easily and have relatively favorable cycle characteristics.

On the other hand, as for the battery D2 (D in FIG. 11) of COMPARTIVE EXAMPLE 3, unlike the result of the cycle life characteristic with a high-load charge pulse, the capacity decreases drastically, and in particular, the DC-IR increases, i.e. the output power decreases, significantly. This is due to the use of the non-graphitizable carbon material for the negative electrode, whereby the negative electrode plate has low conductivity and thus cannot sufficiently respond to the high-load discharge pulse.

It is found from these results that the batteries, using the mixed carbon material of the graphitizable carbon material and the graphite for the negative electrode, have excellent characteristics with respect to a high-load charge/discharge pulse. It is therefore considered that, in the case of using the battery of the present invention for HEVs or the like, it is possible for the battery to support any driving mode and have excellent cycle life.

As for the battery of COMPARTIVE EXAMPLE 3 using the non-graphitizable carbon material and the battery of COMPARATIVE EXAMPLE 4 using only the graphite "d", the capacity drastically deteriorates and it is thus thought that the batteries cannot obtain characteristics sufficient as batteries for HEVs. Further, as for the battery of EXAMPLE 8 singly using the graphitizable carbon material "a", it is considered as difficult to obtain sufficient characteristics when considerably high-load is applied to the battery as in such a case as an HEV drives in an extremely cold region, in a steep site, or the like.

EXAMPLE 9

Batteries G2 to M2 were fabricated in the same manner as in EXAMPLE 5 except that the mixed ratio of the graphitizable carbon material "a" and the graphite "d" was changed as shown in Table 7. It is to be noted that the batteries J2, H2 and M2 in Table 7 are equivalent to the batteries F2, A2 and E2 in Table 6.

TABLE 7

| Battery | Percentage of graphitizable carbon material "a" content (wt %) | Percentage of graphite "d" content (wt %) |
|---|---|---|
| J2 | 100 | 0 |
| G2 | 80 | 20 |
| H2 | 70 | 30 |
| I2 | 50 | 50 |
| K2 | 30 | 70 |

TABLE 7-continued

| Battery | Percentage of graphitizable carbon material "a" content (wt %) | Percentage of graphite "d" content (wt %) |
|---|---|---|
| L2 | 20 | 80 |
| M2 | 0 | 100 |

Evaluation 6

These batteries were subjected to a test on cycle life with a high-load charge pulse and a test on cycle life with a high-load discharge pulse. The capacity retention ratio and the DC-IR increase ratio at the 30000th cycle of each of those batteries are shown in Table 8.

TABLE 8

| | High-load charge pulse cycle | | High-load discharge pulse cycle | |
|---|---|---|---|---|
| Battery | Capacity retention ratio (%) | DC-IR increase ratio (%) | Capacity retention ratio (%) | DC-IR increase ratio (%) |
| J2 | 86 | 25 | 88 | 23 |
| G2 | 95 | 20 | 92 | 18 |
| H2 | 97 | 18 | 95 | 14 |
| I2 | 92 | 23 | 90 | 22 |
| K2 | 79 | 33 | 87 | 23 |
| L2 | 72 | 40 | 86 | 24 |
| M2 | 65 | 47 | 86 | 23 |

It is revealed from Table 8 that the batteries G2, H2 and I2 are favorable in terms of both cycle life characteristics. It is therefore found that the use of the mixed carbon material with a percentage of graphitizable carbon material content in the range of 50 to 80 wt % enables improvement in pulse cycle life characteristic.

On the other hand, the battery J2 exhibits a slightly inferior characteristic to those of the batteries G2, H2 and I2. This is presumably relative to that the battery J2 is designed to be high-loaded, having a negative electrode specific density of 270 Ah/kg.

As for the battery M2 with a percentage of the graphite "d" content of 100 wt %, the charging capability tends to be low, and thereby the cycle life characteristic with a high-load charge pulse cannot be satisfied.

The batteries K2 and L2 with a percentage of the graphitizable carbon material "a" content of 50 wt % or lower have inferior cycle life with a high-load charge pulse because the percentage of the graphite "d" content is high and the battery thus has been affected by a strong property of graphite.

EXAMPLE 10

Batteries N2 to U2 were fabricated in the same manner as in EXAMPLE 5 except that the negative electrode thickness was changed to change the specific density of the negative electrode. Herein, the thickness of the positive electrode active material layer was changed in conjunction with the thickness of the negative electrode material mixture layer.

Evaluation 7

Next, these batteries were subjected to a test on cycle life with a high-load charge pulse. The negative electrode specific density in a fully charged state and the capacity retention ratio as well as the DC-IR increase ratio at the 30000th cycle of each of those batteries are shown in Table 9. It should be noted that the battery S2 in Table 9 is equivalent to the battery A2 in Table 6.

TABLE 9

| Battery | *B | Capacity retention ratio (%) | DC-IR increase ratio (%) |
|---|---|---|---|
| N2 | 150 | 79 | 38 |
| O2 | 170 | 91 | 16 |
| P2 | 200 | 92 | 12 |
| Q2 | 230 | 93 | 11 |
| R2 | 250 | 93 | 11 |
| S2 | 270 | 90 | 14 |
| T2 | 300 | 88 | 18 |
| U2 | 330 | 69 | 59 |

*B: Negative electrode specific density in a fully charged state (Ah/kg)

It is found from Table 9 that, in the battery U2 with a negative electrode specific density of 330 Ah/kg, both the capacity deterioration and the DC-IR increase ratio are significantly large. This is attributable to that the specific density is beyond the range within which the mixed carbon material can reversibly charge/discharge, and hence the charging capability during high-load charge becomes insufficient. Further, the battery N2 with a negative electrode specific density of 150 Ah/kg exhibits large deterioration in capacity and a large DC-IR increase ratio. This is presumably because little or no lithium is intercalated between the graphite layers and the charge/discharge reactions proceed only in the irreversible reaction sites, thereby causing deterioration in cycle life.

On the other hand, it is found that the batteries O2 to T2 have relatively favorable pulse cycle life characteristics as exhibiting the capacity retention ratios not lower than 88%. It is therefore preferable that, when a graphitizable carbon material and graphite are used in combination, a negative electrode specific density in a fully charged state be in the range of 170 to 300 Ah/kg.

As thus described, according to the present invention, deterioration in capacity and an increase in internal resistance can be kept to the minimum even when charge/discharge with a large current pulse are repeated for a long period of time, and a long-lived non-aqueous electrolyte secondary battery can be provided. Such a non-aqueous electrolyte secondary battery is effective especially when used as a battery for HEVs.

It should be noted that, although the lithium-nickel composite oxide was used as the positive electrode active material in above EXAMPLES and COMPARATIVE EXAMPLES, a lithium-manganese composite oxide, a lithium-cobalt composite oxide or the like can also be applied.

Further, although EC, DMC and EMC were used as the solvents of the non-aqueous electrolytes in above EXAMPLES and COMPARATIVE EXAMPLES, any known solvent, such as diethyl carbonate, butylene carbonate or methyl propionate, can be applied. Any solvents having a 4V-class potential resistant to reduction and oxidation is usable singly or in combination.

As for the solute, any conventionally known solutes, such as $LiBF_4$ or $LiClO_4$, can be used.

Although the spiral-wound cylindrical batteries were used for description in above EXAMPLES and COMPARATIVE EXAMPLES, the battery shape is not limited and it can for example be rectangular or thin. Further, it is thought that similar effects can be obtained in using either a stacked cell or a spiral-wound battery.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery, comprising:
   (a) a positive electrode plate comprising a positive electrode current collector and a positive electrode material mixture layer carried on each face of said positive electrode current collector;
   (b) a non-aqueous electrolyte; and
   (c) a negative electrode plate comprising a negative electrode current collector and a negative electrode material mixture layer carried on each face of said negative electrode current collector, wherein
   said positive electrode material mixture layer comprises a lithium-containing composite oxide, a total thickness of said positive electrode material mixture layers on both faces of said positive electrode current collector is not smaller than 40 µm and not larger than 100 µm, said positive electrode plate has an electrode area of not smaller than 520 cm² and not larger than 800 cm² per battery capacity of 1 Ah,
   said negative electrode material mixture layer comprises a graphitizable carbon material capable of absorbing and desorbing lithium, a wide-range X-ray diffraction pattern of said graphitizable carbon material, which is measured by means of CuKα rays, has a peak PX (101) attributed to a (101) crystal face at an angle of about 2θ=44 degrees, and a peak PX (100) attributed to a (100) crystal face at an angle of about 2θ=42 degrees, and a ratio of an intensity IX (101) of PX (101) to an intensity IX (100) of PX(100) satisfies the formula (1):

$$0 < IX(101)/IX(100) < 1.$$

2. The non-aqueous electrolyte secondary battery in accordance with claim 1, wherein said negative electrode plate has a specific density of not smaller than 170 Ah/kg and not larger than 250 Ah/kg when the non-aqueous electrolyte secondary battery is in a fully charged state.

3. The non-aqueous electrolyte secondary battery in accordance with claim 1, wherein a thickness Lc (004) of a crystallite in a c-axis direction of said graphitizable carbon material is not smaller than 20 nm and smaller than 60 nm, and a thickness La (110) of a crystallite in an a-axis direction of said graphitizable carbon material is smaller than Lc (004).

4. The non-aqueous electrolyte secondary battery in accordance with claim 1, wherein said negative electrode material mixture layer further comprises graphite and a percentage of said graphitizable carbon material content in the total amount of said graphite and said graphitizable carbon material is not smaller than 50 wt % and not larger than 80 wt %.

5. The non-aqueous electrolyte secondary battery in accordance with claim 4, wherein said negative electrode plate has a specific density of not smaller than 170 Ah/kg and not larger than 300 Ah/kg when the non-aqueous electrolyte secondary battery is in a fully charged state.

6. The non-aqueous electrolyte secondary battery in accordance with claim 4, wherein a wide-range X-ray diffraction pattern of said graphite, which is measured by means of CuKα rays, has a peak PY (101) attributed to a (101) crystal face at an angle of about 2θ=44 degrees, and a peak PY (100) attributed to a (100) crystal face at an angle of about 2θ=42 degrees, and a ratio of an intensity IY (101) of PY (101) to an intensity IY (100) of PY (100) satisfies the formula (2):

$$1.5 < IY(101)/IY(100) < 2.5.$$

* * * * *